United States Patent
Carle et al.

(10) Patent No.: US 8,256,828 B2
(45) Date of Patent: Sep. 4, 2012

(54) CHASSIS COMPONENT FOR A MOTOR VEHICLE

(75) Inventors: Daniel Carle, Neudenau (DE); Lutz-Eike Elend, Oedheim (DE); Frank Venier, Weinsberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 12/596,520

(22) PCT Filed: Apr. 18, 2008

(86) PCT No.: PCT/EP2008/003136
§ 371 (c)(1),
(2), (4) Date: Oct. 19, 2009

(87) PCT Pub. No.: WO2008/128721
PCT Pub. Date: Oct. 30, 2008

(65) Prior Publication Data
US 2010/0109384 A1 May 6, 2010

(30) Foreign Application Priority Data
Apr. 19, 2007 (DE) .......... 10 2007 018 459

(51) Int. Cl.
*B62D 25/00* (2006.01)
(52) U.S. Cl. .............. 296/187.01; 296/193.06
(58) Field of Classification Search ......... 296/187.01–187.13, 184.1, 193.06; 293/133, 155
See application file for complete search history.

(56) References Cited

U.S. PATENT DOCUMENTS

| | | | | |
|---|---|---|---|---|
| 2,508,032 A | * | 5/1950 | Kennedy | 52/847 |
| 3,332,197 A | * | 7/1967 | Hinkle | 52/844 |
| 5,269,585 A | * | 12/1993 | Klages et al. | 296/205 |
| 5,314,229 A | * | 5/1994 | Matuzawa et al. | 296/187.09 |
| 5,560,672 A | | 10/1996 | Lim et al. | |
| 5,575,500 A | * | 11/1996 | Mimura et al. | 280/751 |
| 5,735,097 A | * | 4/1998 | Cheyne | 52/489.1 |
| 6,189,930 B1 | * | 2/2001 | Kalazny | 280/781 |
| 6,679,540 B1 | | 1/2004 | Graber et al. | |
| 2004/0102120 A1 | * | 5/2004 | Plusquellec et al. | 442/370 |

FOREIGN PATENT DOCUMENTS

| | | | |
|---|---|---|---|
| DE | 1812449 | | 7/1969 |
| DE | 3343402 | * | 6/1985 |
| DE | 39 18 280 A1 | | 12/1990 |
| DE | 19538844 C2 | | 4/1997 |
| DE | 19633911 A1 | | 2/1998 |
| DE | 20318501 U1 | | 2/1998 |
| DE | 102006045494 A1 | | 4/2008 |
| GB | 1246995 A | | 9/1971 |

* cited by examiner

*Primary Examiner* — Dennis Pedder
(74) *Attorney, Agent, or Firm* — Novak Druce+Quigg LLP

(57) ABSTRACT

A chassis component of a motor vehicle including a first outer component and a second inner component connected to the first outer component to form a composite, wherein the first outer component is formed of a material of greater ductility than the material of the second inner component whereby the force of impact on said composite component will be absorbed by deformation of said first outer component.

7 Claims, 2 Drawing Sheets

CHASSIS COMPONENT FOR A MOTOR VEHICLE

The invention relates to a chassis component for a motor vehicle.

BACKGROUND OF THE INVENTION

GB 1 246 995 discloses such a chassis component which is composed of several individual components. Among other items, the chassis component comprises two sheet metal shells which are joined together to form the inner carrier region of the chassis component. Furthermore, the chassis component made as a side rail encompasses an outer rail lining which is produced from plastic. Overall a composite component which has a plurality of cavities is thus formed, the plastic rail lining not contributing to the stiffening of the chassis or to the absorption capacity in the case of an impact.

The object of this invention is therefore to devise a chassis component of the initially mentioned type which has especially improved crash and stiffness properties.

SUMMARY OF THE INVENTION

In order to devise a chassis component which has been optimized with respect to its crash properties and stiffness properties, it is provided according to the invention that the first individual component of the chassis component have increased ductility for absorption of accident-induced impact energy and the second individual component have a conversely increased stiffness. In other words, the chassis component here encompasses an at least two-part structure represented by the respective individual components, one part of the chassis component being used for controlled energy absorption and the other part being used for support of the energy-absorbing individual component. The individual component which has increased ductility thus has the advantage that in accident-induced application of force it deforms in a ductile manner which is very controlled and in the process consumes energy. Conversely, on the one hand the other individual component which has elevated stiffness ensures reliable support of the energy-consuming component and on the other hand ensures that, for example, a survival space for the passengers of the vehicle remains.

In order to ensure the indicated mechanical properties it can be provided, for example, that the two individual components are produced from different metal alloys. Of course, also other materials would be conceivable. Another possibility consists in that the two components have different wall thicknesses, optionally in combination with different materials, in order in this way to achieve on the one hand high stiffness of one component and on the other high ductility of the other component.

But the chassis component according to the invention also has improved stiffness properties overall since the individual components form a composite component which has at least two hollow chambers and by itself a correspondingly high stiffness due to its multi-chamber construction.

In another configuration of the invention, the first individual component forms the outer component region and the second individual component forms the inner component region of the composite component. In this way especially advantageous action of the chassis component is achieved, specifically the outer component region in the case of accident-induced application of force can be deformed in a corresponding controlled manner, while the other, inner component region is used on the one hand for support of the outer component region and on the other for maintaining the survival space of the passengers of the vehicle.

In another configuration of the invention it has, moreover, been shown to be advantageous for at least one and particularly the second or inner individual component to be formed from an extruded section. An especially stiff and still weight-favorable individual component can be formed by this extruded section, as a result of which component the other, in particular outer individual component is accordingly reliably supported, and as a result of which a survival space in the region of the passenger compartment can be ensured for the passengers. Especially high stiffness of the extruded section can, moreover, be achieved when it is made as a multi-chamber section with a corresponding plurality of individual chambers.

The first or outer individual component in another configuration of the invention is made essentially U-shaped preferably in cross section, the individual component being connected to the second individual component by way of its two free legs. These two free legs thus yield a simple possibility for adjusting the crash behavior or the energy absorption capacity of the first individual component. For this purpose the two free legs in one preferred embodiment are provided with increased ductility for absorption of the accident-induced impact energy. In other words, it has been found to be advantageous if especially the two free legs are deformed in accident-induced application of force, while the leg which connects them retains its shape essentially even after accident-induced application of force.

Especially advantageous action of the chassis component can be achieved when the first or second individual component is formed from different materials. Thus, due to the different materials on the one hand the desired high ductility for absorption of accident-induced impact energy and on the other high stiffness can be achieved, by means of which preferred support of the other individual component and maintenance of a survival space for the seat occupants can be ensured.

In another configuration of the invention it has been shown, moreover, to be advantageous if at least two individual components have walls with different thicknesses. In this way, optionally in addition to the different material selection, an additional possibility can be made available to provide the different functions of the two individual components.

Another advantage over the conventional one-piece extruded section is moreover that the thicknesses of the walls of the chassis component can be reduced overall by the at least two individual components here. Since specifically the two individual components taken for themselves have a smaller cross section, they can be pressed using fabrication technology with an extremely small wall thickness, for example in an extrusion process. The individual extruded sections can then be easily joined to one another, for example, by means of joint connections so that overall a chassis component can be implemented which on the one hand, for example, has a relatively large cross section and on the other conversely a relatively small wall thicknesses. Thus, overall it is apparent that with this invention a longstanding target conflict can be resolved, specifically to produce bearing chassis components with a relatively large cross section and a conversely relatively small wall thickness. This is, however, of great importance for the lightweight construction of chassis components so that the individual components and especially the second individual component can be designed from an alloy with higher strength and smaller wall thicknesses.

It has furthermore been shown to be advantageous that at least two individual components are combined by means of a joint connection and/or a positive connection. The joint connection can especially increase the stiffness of the composite component since the two individual components complement one another in the optimum manner with respect to their static and dynamic stiffness. The positive connection of the two individual components moreover has the further advantage that especially reliable support of the energy-absorbing first individual component on the supporting second individual component can be accomplished. Thus, the positive connection for accident-induced force application ensures especially reliably that an additional joint connection or other mechanical connection cannot loosen and, accordingly, energy absorption of the first individual component will not function completely. Rather the positive connection ensures in an optimum manner that the desired energy absorption of the first individual component can be guaranteed by way of a maximum energy absorption length.

DETAILED DESCRIPTION OF THE PREFERRED EMBODIMENTS OF THE INVENTION

Figure 1B:
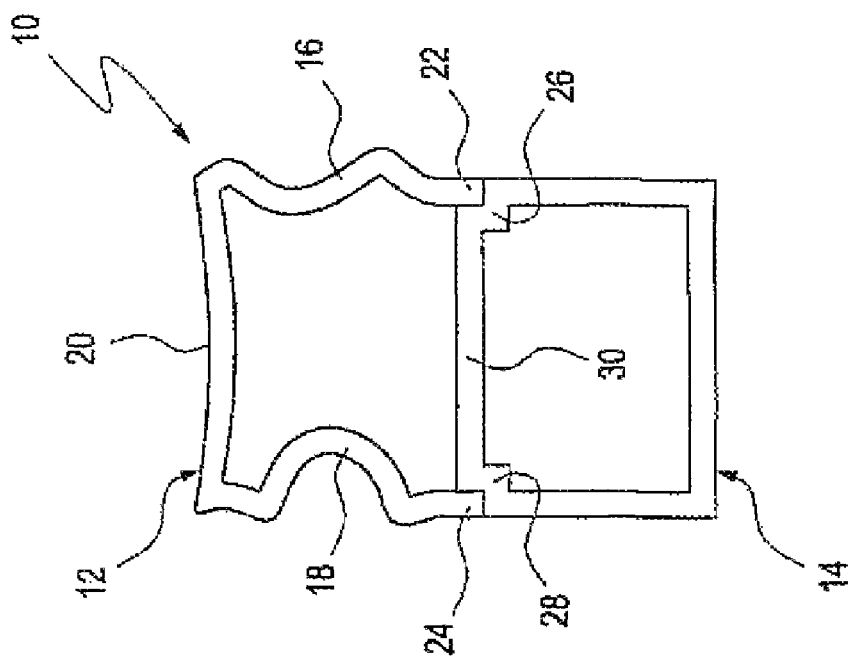
FIG. 1a, 1b show a schematic sectional view of a chassis component composed of two individual components for a passenger car, which are combined positively and materially into a composite component which has two hollow chambers, according to FIG. 1b the first individual component having increased ductility for absorption of accident-induced impact energy and the second individual component having conversely increased stiffness for support of the first deformed individual component.
Figure 1A:
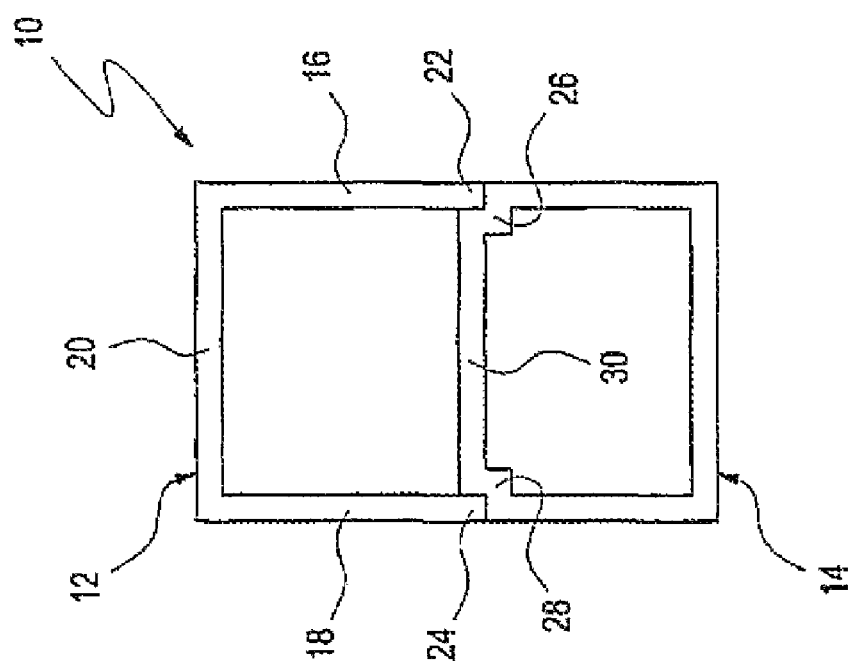

FIGS. 1a and 1b each show in a schematic sectional view a chassis component in the form of a door pillar 10—for example the B pillar. While FIG. 1a shows the door pillar 10 in the undeformed state, FIG. 1b, as will be detailed below, shows the pillar 10 after accident-induced application of force, for example, as a result of a side impact of the passenger car.

The door pillar 10 here comprises a first outer individual component 12 and a second inner individual component 14. In other words, the individual component 12 here faces the outside of the vehicle and the individual component 14 faces the passenger compartment of the motor vehicle which is not otherwise shown.

FIG. 1a shows that the first individual component 12 is made essentially U-shaped and comprises two free legs 16, 18 which are connected integrally to one another by way of a connecting leg 20. The outer individual component 12 can be produced as an extruded section, in a sheet metal shell construction or in some other production method. Suitable materials for the individual component 12 can be, in particular, metal alloys, optionally plastic materials would also be conceivable.

The second or inner individual component 14 here has a peripherally closed hollow section and has been produced in an extrusion process. Here the individual component 14 encompasses an essentially rectangular basic outline. The extruded section can consist essentially of a metal alloy. Alternatively, it would, of course, also be conceivable to produce the individual component from another type of material, especially a plastic.

While FIG. 1a shows the multi-chamber section of the door pillar 10 formed by the two individual components 12, 14 in its initial profile, FIG. 1b shows the door pillar 10 after accident-induced application of force. In this door pillar 10 this accident-induced application of force can take place, for example, by a side impact of another vehicle against the respective passenger car.

It can be recognized that the outer or first individual component 12 has increased ductility for absorption of the accident-induced impact energy, and consequently has been deformed accordingly as the impact energy is absorbed, while the second inner component 12 has a conversely increased stiffness and thus remains essentially undeformed. This increased ductility of the first individual component 12 can be achieved, for example, by a corresponding choice of the material relative to the correspondingly stiffer individual component 14. Another possibility is to provide the individual component 12 with correspondingly other, especially smaller wall thicknesses in order in this way to achieve the desired resilience of the individual component 12. In the opposite conclusion, the individual component 14 is accordingly stiffer, for example, it is made from a higher-strength material so that extremely stiff support of the energy-absorbing individual component 12 can be accomplished. The individual component 14 which has remained largely unchanged after the impact can, moreover, ensure that the door pillar 10 is essentially not deformed at all or at least not unduly in the direction of the passenger compartment or in the direction of the seat occupants. The seat occupant thus is optimally protected in case of a side impact.

FIGS. 1a and 1b furthermore show that essentially the two free legs 16, 18 have the increased ductility of the first individual component 12. This results in that the two legs 16, 18 essentially absorb the impact energy while the connecting leg 20 is preserved essentially in its shape. It is clear that accordingly the legs 16, 18 extend essentially in the impact direction or in direction of application of force.

Furthermore FIGS. 1a and 1b show that the free ends 22, 24 of the free legs 16, 18 are connected essentially positively to the corresponding steps 26, 28 of the inner individual component 14. In other words, the two free ends 22, 24 are spaced apart from one another such that positive fixing of the first individual component 12 relative to the second individual component 14 arises, especially transversely to the impact direction of the impact force. In this way it is ensured for accident-induced application of force that the first individual component 12 remains securely on the second individual component 14. Here the two free ends 22, 24 encompass the corresponding wall section 30 between the two steps 26, 28 of the individual component 14.

In this embodiment, the two individual components 12, 14 are moreover assembled to one another by a joint connection, in particular an adhesive or weld connection. The advantage of an adhesive connection consists especially in that it can be easily produced and has high connection quality. As has advantageously also been shown in particular, when the two individual components 12, 14 are joined to one another by a weld connection, and especially by a friction stir weld connection. Such friction stir weld connections represent an especially simple and clean possibility for joining lightweight metal alloys. Compared to conventional joining methods, due to the high seam strength they are especially stable so that considerable weight can be saved. Another advantage of friction stir welding is that temperatures preferably below the melting point of the lightweight metal alloys to be joined are achieved so that an adverse structural change can be avoided when the melt solidifies. Thus it is especially also possible to weld higher strength aluminum alloys which are classified as difficult to melt or conditionally meltable without additives and without high strength loss. Finally, one special advantage is that these friction stir welding methods require relatively little mechanical equipment and, accordingly, low investment costs. As encompassed within the scope of the invention it can, however, be considered that also other welding process, in particular laser welding or MIG welding, can be used.

It is likewise conceivable to protect this plug connection between the free ends 22, 24 and the steps 26, 28 by catch connections or clip connections. Of course it would also be conceivable to mechanically connect the two individual components 12, 14 to one another.

Overall, FIGS. 1a and 1b, however, show that the free ends 22, 24 in accident-induced application of force are supported directly on the corresponding steps 26, 28. The free ends 22, 24 are prevented from slipping away beyond the steps 26, 28 especially by the indicated joint connection. This yields the desired very good support for the individual component 12 so that it can deform accordingly especially with deformation of the two legs 16, 18.

Another advantage of this door pillar 10 is that the wall thicknesses of the combined multi-chamber section can be made much more variable than when the composite is extruded from only one section. This is especially due to the fact that integrally extruded sections must have a minimum wall thickness which is measured on a circumscribed circle of the component. If accordingly the cross section of this component increases, the minimum wall thickness of this integral section must be increased accordingly. In contrast, the wall thicknesses for the two individual components 12, 14 can be selected to be accordingly small, after assembly of the two individual components 12, 14 wall thicknesses resulting which are advantageously small for the overall component, the door pillar 10. Thus weight can be advantageously saved at high stiffness of the door pillar 10. In particular, it is also possible to make the first individual component 12 with increased ductility accordingly with smaller wall thicknesses than the supporting second individual component 14.

Figure 2:
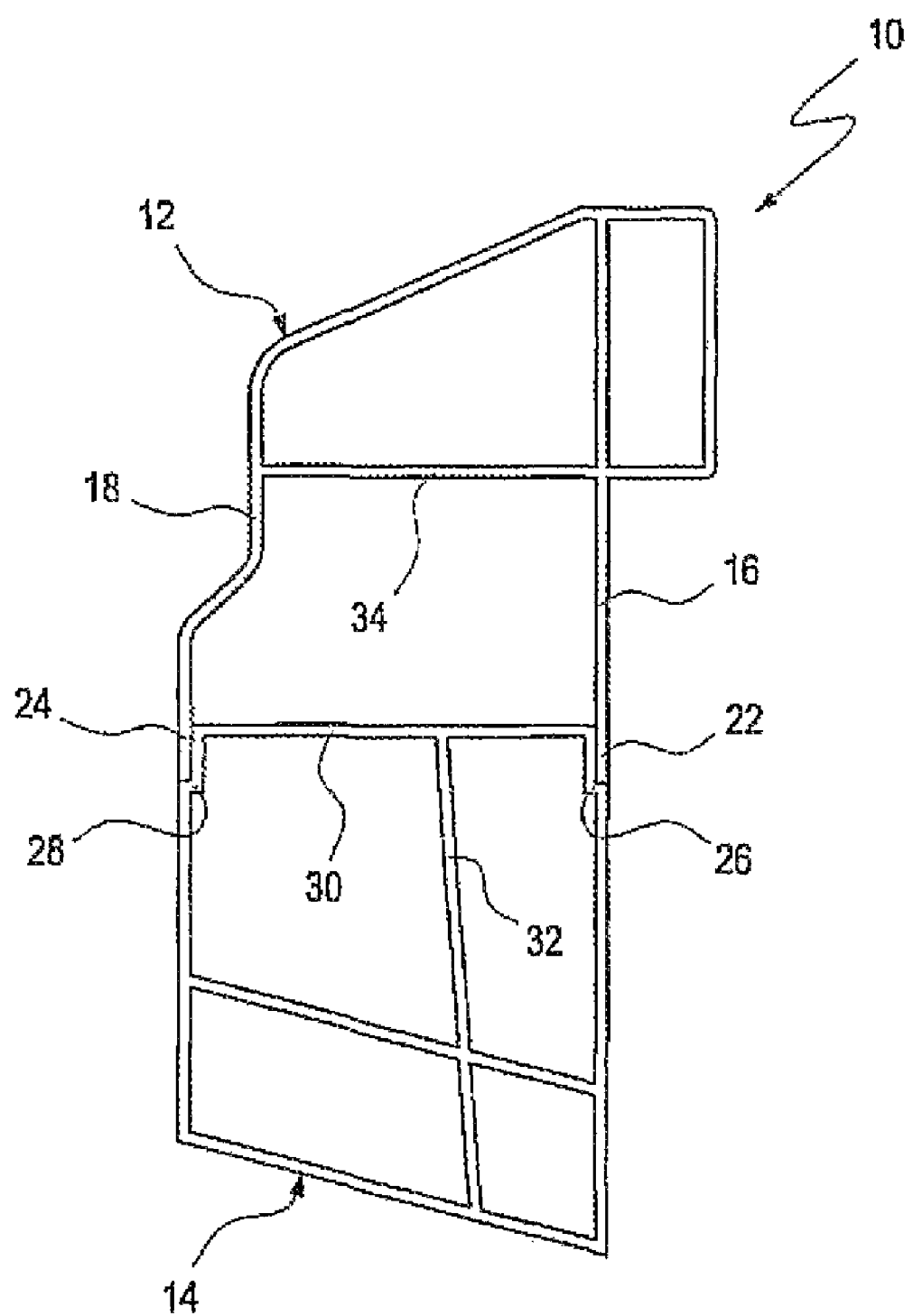
FIG. 2 shows a schematic sectional view through another chassis component for a passenger car whose two individual components are produced from an extruded section which has several chambers, the two individual components being combined with one another positively and materially.

FIG. 2 shows in a schematic sectional view another chassis component 10 which is characterized essentially in that the two individual components 12, 14 are each made as multi-chamber extruded sections. The outer individual component 12 in turn has two free legs 16, 18 whose free ends 22, 24 are supported in turn on the corresponding steps 26, 28 of the second individual component 14 with high stiffness. Thus, in this case a chassis component 10 is in turn implemented in which the first outer individual component 12 is made accordingly compliant with high ductility and the second individual component 14 has a conversely increased stiffness. In this case this is also achieved among other things by the two individual components 12, 14 having a corresponding chamber arrangement. While specifically the stiffer individual component 14 has a wall 32 which runs transversely to the major impact direction, this is not the case for the individual component 12 with high ductility. Rather the wall 34 there runs essentially transversely to the primary impact direction in the case of a side impact of another passenger car.

The invention claimed is:

1. A chassis assembly of a motor vehicle, comprising:
a first component provided with a cross-section configuration including a pair of spaced walls partially defining at least one hollow section, each of said walls including an indentation recessed from an outer surface thereof and aligned with a side wall of said first component; and
a second component provided with a u-shaped cross-sectional configuration including a pair of leg portions, each of said leg portions having an end section received into one of said indentations and secured to said first component,
wherein said second component is formed of a material having a greater ductility than said first component.

2. The chassis assembly of claim 1 wherein at least one of said first and second components are formed by an extrusion method.

3. The chassis assembly of claim 1 wherein said first component is formed of a stiff material and said second component is formed of a ductile material.

4. The chassis assembly of claim 1 wherein the cross-sectional configuration of said first component is polygonal.

5. The chassis assembly of claim 1 wherein said end section of said leg portions of said second component are welded to said walls of said first component.

6. The chassis assembly of claim 1 wherein said indentations are elongated and disposed in alignment with said spaced walls of said first component whereby forces imparted on said second component are partially absorbed by deformation of said leg portions of said second component and partially transferred to said spaced walls of said first component.

7. The chassis assembly of claim 1 wherein said first and second components comprise a pillar of the chassis of a motor vehicle.

\* \* \* \* \*